US006934552B2

(12) United States Patent
Holley et al.

(10) Patent No.: US 6,934,552 B2
(45) Date of Patent: Aug. 23, 2005

(54) METHOD TO SELECT AND SEND TEXT MESSAGES WITH A MOBILE

(75) Inventors: Martin Holley, Vienna (AT); Karin Huber, Vienna (AT)

(73) Assignee: Koninklijke Philips Electronics, N.V., Eindhoven (NL)

( * ) Notice: Subject to any disclaimer, the term of this patent is extended or adjusted under 35 U.S.C. 154(b) by 403 days.

(21) Appl. No.: 10/106,982

(22) Filed: Mar. 26, 2002

(65) Prior Publication Data

US 2002/0142787 A1 Oct. 3, 2002

(30) Foreign Application Priority Data

Mar. 27, 2001 (EP) .............................................. 01890097

(51) Int. Cl.$^7$ .......................... H04Q 7/20; H04M 1/00; G10L 19/00; G10L 21/00; G10L 21/06
(52) U.S. Cl. ................. 455/466; 455/412.1; 455/550.1; 455/563; 455/566; 704/201; 704/275; 704/276
(58) Field of Search ................................ 704/201, 236, 704/270–277, 235, 246–247; 455/550.1, 563–566, 569.1, 569.2, 412.1, 413, 414.4, 422.1, 466; 379/88.01, 88.03, 88.04

(56) References Cited

U.S. PATENT DOCUMENTS

| 5,664,058 | A | | 9/1997 | Vysotsky ..................... 704/243 |
| 5,839,109 | A | * | 11/1998 | Iwamida ...................... 704/271 |
| 6,249,759 | B1 | * | 6/2001 | Oda ............................ 704/222 |
| 6,434,403 | B1 | * | 8/2002 | Ausems et al. ........... 455/556.2 |
| 6,577,881 | B1 | * | 6/2003 | Ehara .......................... 455/563 |
| 6,594,347 | B1 | * | 7/2003 | Calder et al. ............. 379/88.01 |
| 2002/0107689 | A1 | * | 8/2002 | Liu ............................. 704/251 |

FOREIGN PATENT DOCUMENTS

| EP | 04050529 A1 | 2/1991 | ............ H04M/1/64 |
| WO | WO0115140 | 1/2001 | ........... G10L/15/26 |

* cited by examiner

Primary Examiner—Nick Corsaro
Assistant Examiner—Meless Zewdu

(57) ABSTRACT

To send text messages, a text together with a transmit address is input into a transmitting device by voice input, where the voice input is processed in a speech recognition unit and compared with predefined text patterns stored in memory means. A predefined text pattern which is the closest match to the is text selected and displayed. The user must confirm that the displayed text is the intended, for the text message to be sent.

17 Claims, 3 Drawing Sheets

US 6,934,552 B2

METHOD TO SELECT AND SEND TEXT MESSAGES WITH A MOBILE

BACKGROUND OF THE INVENTION

1. Field of the Invention

Figure 1:
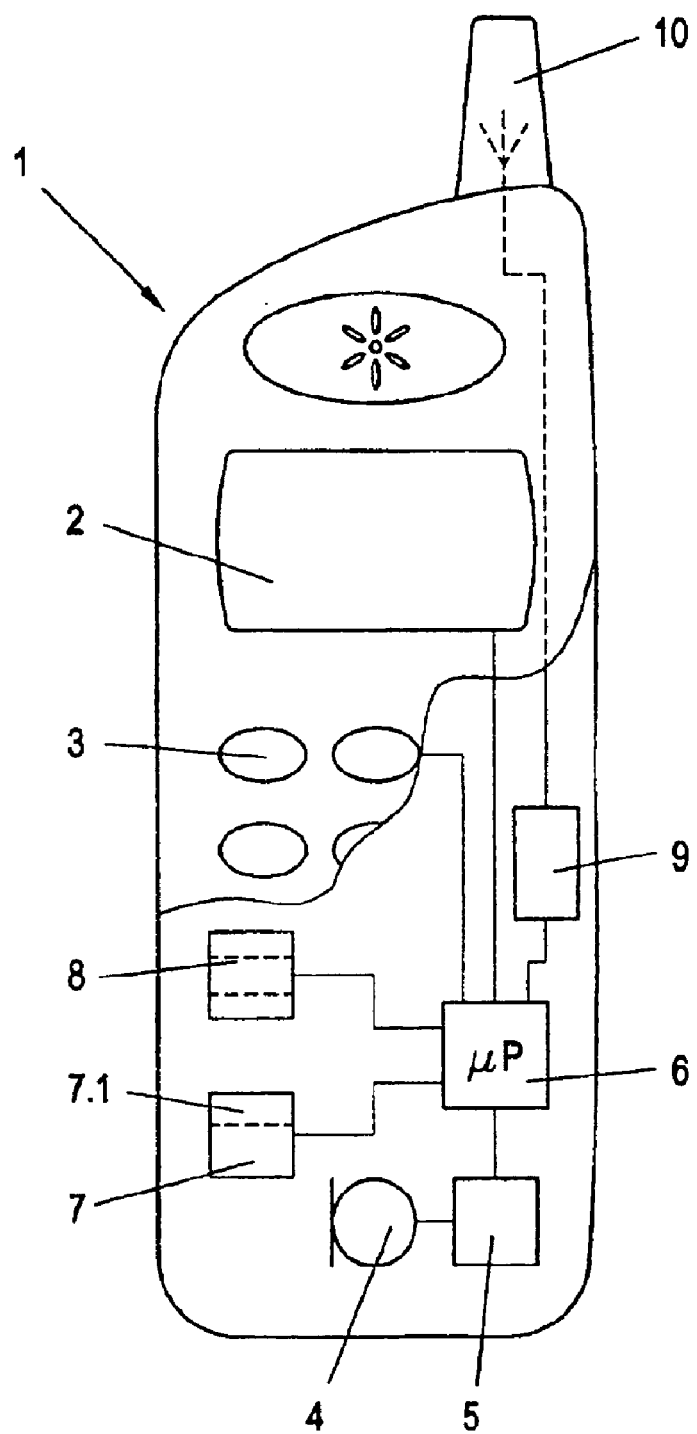

The invention relates to a method of sending text messages, a text being input together with a transmit address into a transmitting device and the text message being sent by means of the transmitting device to the stated transmit address.

The invention further relates to a device for sending a text message to a transmit address, comprising text input means for inputting a text, transmission means associated therewith for sending a text message on the basis of the input text, voice input means and a speech recognition unit, and display means.

2. Description of Related Art

It is known per se from U.S. Pat. No. 5,664,058 to use speech recognition technology with cell phones to effect dialing of desired destination numbers by voice input. A training method is also disclosed therein, to train the speech recognition system to recognize new dialing commands. The transmission of text displayed on a display is not provided, however.

A Philips cell phone apparatus with comparable speech recognition for dialing certain desired numbers is additionally available on the market under the name "Genie". With this cell phone apparatus, the correct stored telephone number may be retrieved in response to speaking the desired addressee (e.g. "office", "department" or indeed names of private individuals) after running the speech recognition software, this telephone number then being automatically dialed by the apparatus and the connection effected. This cell phone apparatus is also designed to send so-called SMS or short messages (SMS=Short Message Service), but the text messages to be sent have to be input manually via the keypad of the cell phone. This is awkward and laborious, the miniaturization of cell phone apparatuses also making such manual inputting of text laborious, where individual keys often have to be pressed repeatedly to input a particular letter.

OBJECTS AND SUMMARY OF THE INVENTION

It is an object of the invention to find a remedy for this and to provide a method and a device as indicated above which enable the inputting and sending of text messages, in particular SMS messages (short messages), in a simple, user-friendly manner. In this respect, it should also be taken into account that, in particular in the case of cell phone apparatuses, though the application of the invention is not intended to be restricted to such, only a small amount of space is available for electronic components and thus also very little storage capacity, so that the object must be achieved with simple circuit components.

The method of the above-stated type according to the invention is characterized in that the text is input by voice input, processed in a speech recognition unit and compared with stored, predefined text patterns, a predefined text pattern which is the closest match to the text being selected and displayed, whereupon, once it has been confirmed, it is used as the text for the text message to be sent.

The device of the above-stated type according to the invention is accordingly characterized in that the text input means comprise the voice input means, from which the spoken text is supplied to the speech recognition unit, which, for supplying text data derived from the spoken text, is connected with a comparison unit which is further associated with memory means for predefined text patterns, the comparison unit being designed to compare the text data supplied with predefined text patterns and to select a predefined text pattern which is the closest match to the text or the text data, which text pattern is supplied to the display means for display and, upon confirmation, is supplied via the input means to the transmission means for sending.

According to the invention, therefore, at least partly firmly predefined texts are stored as text patterns, these text patterns requiring manual input on a single occasion. When text messages are subsequently sent, these are spoken into an electro-acoustical transducer and converted into electric signals, which, after appropriate digitization, are supplied to the speech recognition unit. The speech recognition program used may be kept relatively simple with respect to the generally only small number of text messages which are to be stored in the form of text patterns and with which the spoken texts are to be compared, such that no great storage capacity is required therefor and thus the cost of electronic storage components may be kept low. The text data derived from the spoken text in the speech recognition unit are compared with the predefined text patterns, which are retrieved from the memory means, wherein the comparison unit may in particular comprise a processor which is in itself already present. On the basis of this comparison, the predefined text pattern which constitutes the closest match is selected and displayed to the user, so that the latter may examine it and optionally confirm the selection, whereupon the text is sent to the desired address. To this end, a telephone number may be conventionally input.

In practice, similar texts in which only parts have to be changed, such as for example time and place information if meetings are being arranged, have frequently to be used. In this respect, the text patterns may thus contain variable portions, wherein these variables are then replaced for example by corresponding text portions of the spoken text or by input text portions input manually. In addition to the above-mentioned time and place information, the variables may also include other information which changes in frequently recurring text messages, such as in particular names of individuals, addresses etc. These data, which need to be inserted in the text messages to be sent instead of the variables, may be produced in the database or, as mentioned, on the basis of the spoken text. In this respect, it is also feasible for further data to be automatically assigned to the automatically inserted data, such as in particular transmit address data (transmit telephone numbers) in association with names. In this way, suggestions may automatically be made, in conjunction with text patterns, as to the destination address to which the respective text message is to be sent.

To make speech recognition and the comparison with text patterns as simple as possible, provision is advantageously made for the spoken text to be examined for keywords, wherein these keywords are compared with stored keywords, in order in each case to relay the text pattern which is the closest match. Such keywords may be for example words such as "late", "meet", "congratulations" and the like, wherein in the first instance spoken texts such as "I'm late", or "I'm going to be late" and the like are recognized on the basis of the keyword "late". The same is true of texts containing the keyword "meet" or the keyword "congratulations". In the first instance, a stored text pattern may then read as follows, for example: "I'm going to be (variable) late". For safety reasons, this text pattern is then displayed as a suggestion, so that it is possible to modify it or add to it. For example, the text could ultimately be manually complemented as follows: "I'm going to be 10 minutes late for today's meeting". The variable (here a time) may be replaced by manual input, for example by inputting the expression "10 minutes".

In order additionally to minimize the effort involved in speech recognition, provision may also be made for speech recognition to proceed in speaker-dependent manner, i.e. sample utterance patterns are spoken previously by the user of the apparatus, so that speech recognition may proceed on the basis of these patterns in simplified manner and in a shorter time. In particular, the storage capacity for storing the speech recognition module together with vocabulary may amount to as little as approximately 500 kB to 1 MB. If the storage capacity is correspondingly greater, it is of course also feasible for speech recognition to proceed in speaker-independent manner; moreover, with a corresponding storage capacity, more keywords and categories of variable may be provided.

If speech recognition is speaker-dependent, the advantage of a relatively small storage space requirement is not the only advantage obtained; in addition, the advantage is obtained that it is not readily possible for others who might use the device, in particular a cell phone apparatus, to send text messages or short messages, which is for the most part in the interests of the owner of the cell phone apparatus.

It should also be mentioned that, although it is preferable for all the units necessary for the invention, namely in particular the speech recognition unit together with the comparison unit, the text or voice input means and the display means, to be accommodated in a single integrated apparatus, in particular a cell phone apparatus, it is also altogether feasible to separate them: thus, it is likewise possible, for instance in order not to overload cell phone apparatuses, to send the text message spoken by the user in the form of audio data for example over the Internet to a computer (server) which comprises the necessary speech recognition software and on the basis thereof analyzes the sent spoken text and then sends back either the text pattern found or, as a preliminary stage, particular characteristic data (e.g. phoneme sequences of words recognized in the audio data) to the sending device, i.e. in particular the cell phone apparatus. The selected text message, in particular short message, is then sent by this device to the desired receiver, in particular another cell phone apparatus. Instead of cell phone apparatuses, the sending and receiving apparatuses may also be PCs designed to send short messages and similar text messages. In addition, these apparatuses may also be portable handheld computers, such as palmtops or Personal Digital Assistants.

BRIEF DESCRIPTION OF THE DRAWING FIGURES

Figure 2:
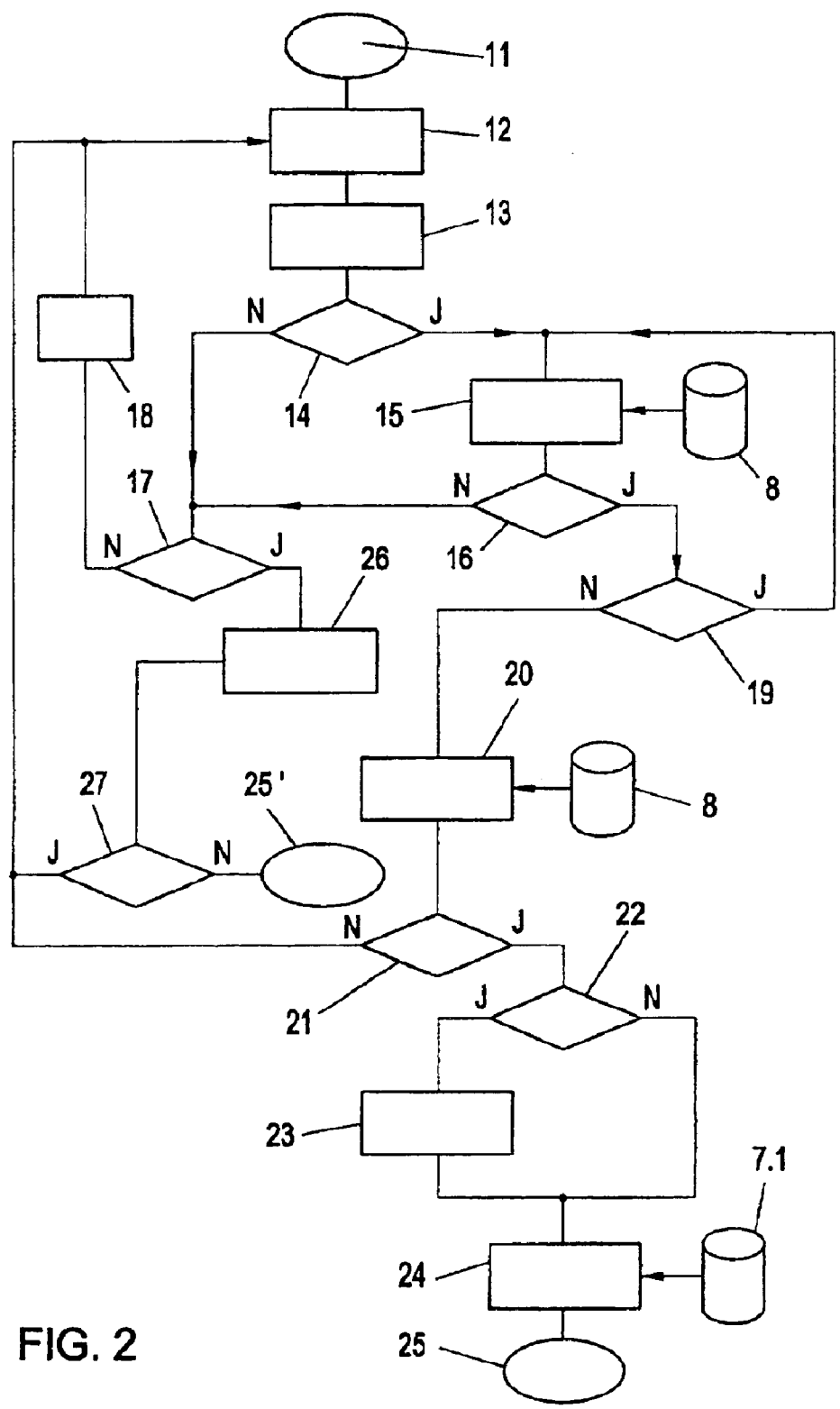
Figure 3:
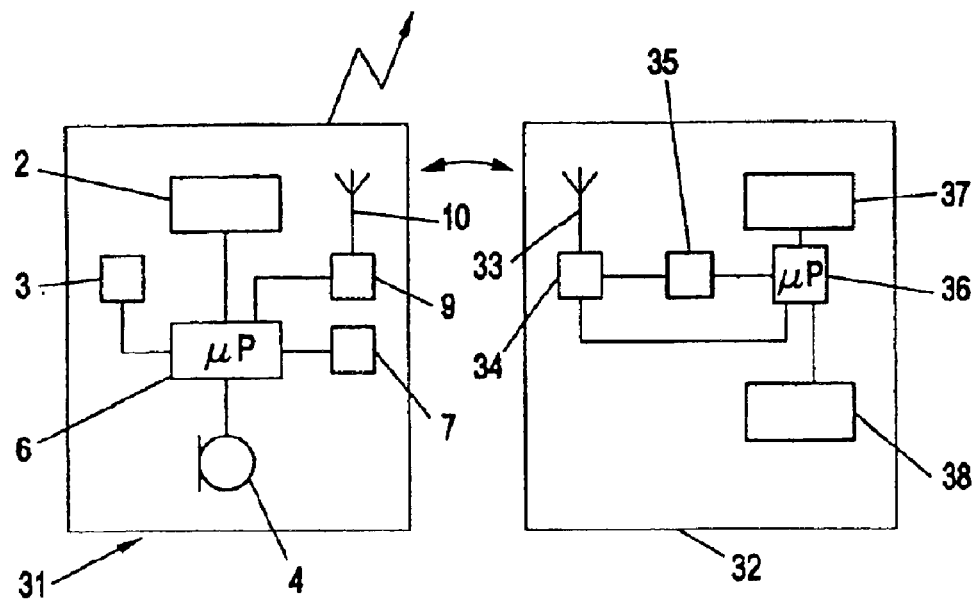
Figure 4:
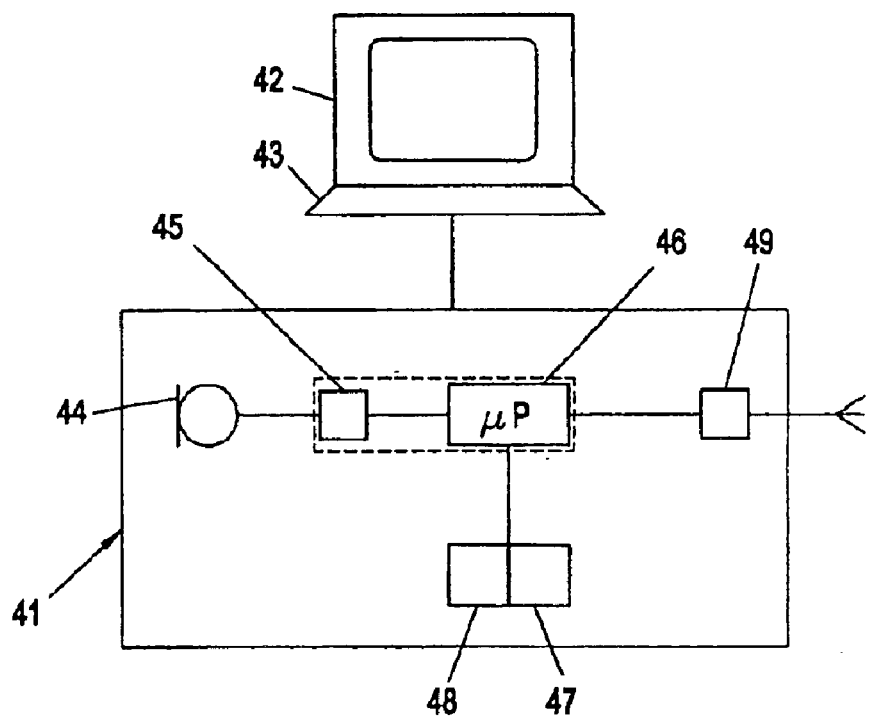

The invention will be further described with reference to examples of embodiment shown in the drawings to which, however, the invention is not restricted. In the Figures:

FIG. 1 is a schematic representation, in the form of a block diagram, of a currently particularly preferred embodiment in the form of a cell phone apparatus with the components installed therein for performing the invention;

FIG. 2 shows a flow chart clarifying the procedure involved in determining a text pattern and sending the text message in response to spoken text input; and FIGS. 3 and 4 are block diagrams comparable with that of FIG. 1 of two further possible embodiments, wherein in FIG. 3 a cell phone communicates with a server to carry out speech recognition before the desired text message is sent, whereas FIG. 4 shows an embodiment with a computer (PC).

DETAILED DESCRIPTION OF THE INVENTION

FIG. 1 is a schematic representation of a cell phone apparatus 1, which is provided in a per se conventional manner with display means in the form of an LCD display 2 and with input means in the form of conventional keys 3. The keys 3 serve for inputting telephone numbers to be dialed and desired functions and, in principle, also for inputting and sending short messages (SMS messages).

The lower half of FIG. 1 is a cut-away representation additionally showing, in the form of a block diagram, the basic structure of the cell phone apparatus 1, insofar as it is of interest here.

It is clear therefrom that input means 4 for voice input are present in the form of an electro-acoustical transducer or microphone, to which a speech recognition unit 5 is connected, in order to analyze spoken words in a per se conventional manner. This makes it possible on the one hand, in a manner known per se, to enter desired destination numbers by voice input, the desired destination numbers being retrieved from a database 7 via a processor 6. On the other hand, the voice input means 4, together with the speech recognition unit 5, also allow acoustic input of texts, in order to send SMS messages via the cell phone apparatus 1 to another cell phone apparatus or to a PC acting as a receiver. The speech recognition unit 5 is also used for this purpose, wherein it is appropriately reset via appropriate adjustment, for example by pressing a suitable function key 3, and via the processor 6 to analyze the spoken text input, by examining the text data for certain keywords. Appropriate predefined keywords may be stored in a memory 8, which is connected separately from the database 7 to the processor 6, and the processor 6 acts as a comparison unit, in order to compare the retrieved stored keywords with the keywords supplied by the speech recognition unit 5 and in each case to select the stored keyword which is the closest match. It goes without saying that the memory 8 and the database 7 may be embodied in a common memory chip.

The processor 6 is connected not only with the keys 3 but also with the display means 2, in order, after determination of the most suitable keyword, to display the matching text pattern, likewise stored in the memory 8, and to offer it to the user for confirmation. The user may then effect changes to the text pattern displayed on the display means 2 manually via the keys 3 and insert additions, or he/she may also simply confirm the proposed text, whereupon the short message is transmitted conventionally via the processor 6 and per se conventional transceiver means 9 and an antenna 10.

The stored text patterns preferably also contain variable text portions, such as for example "Let's meet at (time variable) at (meeting place variable)". These variable text portions, such as time and place information, may be inserted manually, but it is also feasible to retrieve such text portions from the database and suggest them to the user. In the present example, these may comprise a group of options for the meeting place, e.g. "at home", "at the office" etc. As far as time information is concerned, this variable is appropriately inserted manually by means of the keys 3. The keyword for the above text message might be the word "meet", wherein the user may also utter other phrases, such as "I suggest that we meet at . . . o'clock at home (at the office, in such and such a pub etc)", in order to get to the previously cited text pattern via the keyword "meet".

If the speech recognition unit 4 is appropriately equipped, it is of course also possible to recognize from the spoken text that has been spoken, information concerning for instance meeting place or time and then automatically to make the appropriate insertions at the position of the variable text portions in the retrieved text pattern. Such a procedure is particularly suitable, however, when specific individuals are being addressed whose names are stored in the database 7, for example in a database field 7.1, together with associated addresses and telephone numbers (as an address file).

FIG. 2 is a schematic representation, in the form of a flow chart, of an example of the procedure involved in sending a text message, in particular an SMS message. It is shown that, after a start step 11 at block 12, acoustic voice input is effected, i.e. the text is input by voice. At block 13, the speech recognition unit 5 processes the spoken text and analyzes it by examining it for keywords.

At block 14, an inquiry is made as to whether a keyword has been detected and, if yes, at block 15 this found keyword is compared with the keywords stored in the memory 8, which according to FIG. 1 are retrieved from the memory 8 by the processor 6. It is then asked at block 16 whether a matching keyword has been found. If no keyword has been detected, after an inquiry at block 17 as to whether the third input attempt has already been reached, a request is made at block 18 for the acoustic voice input to be repeated, whereupon the text is input again by voice, see block 12. (It goes without saying that fewer or more than the three attempts provided at block 17 may be allowed.)

If it is established at block 16 that a matching keyword is present, the inquiry is additionally made at block 19 as to whether a further keyword has been detected; if yes, this further keyword is also compared at block 15 with the stored keywords and examined for a matching keyword. If no further keyword is present, the associated text pattern, produced on the basis of the keyword or keywords which has or have been found, is displayed in accordance with block 20 and at block 21 the user is asked whether he accepts the text pattern which has likewise been retrieved from the memory 8. If not, the process may be stopped per se or the user may, as shown in FIG. 2, return to the acoustic voice input step, block 12.

If at block 21 the text is accepted at least in principle, it is then asked at block 22 whether the text is to be complemented or corrected (in general: revised) manually and if yes, corresponding revision of the text is performed at block 23 by manual input of characters via the keys 3. Then, or if no text revision is to be performed, the text may be transmitted in accordance with block 24, wherein the corresponding destination telephone numbers may be retrieved from the database 7.1, for example also by inputting shortcuts. The end of the procedure is then reached at block 25.

If the response to the inquiry at block 17 is that the last (e.g. third) attempt at acoustic text input has already been made and this attempt was also unsuccessful, it is displayed at the display 2, at block 26, that transmission is impossible or the spoken text cannot be analyzed. It is then asked at block 27 whether a different text is to be input and, if yes, the user is returned to block 12 for acoustic voice input. If no, the user is sent to block 25', end of procedure.

FIG. 3 shows a device modified relative to FIG. 1, in which the task of speech recognition and analysis of the acoustic text input with respect to given keywords is separate from the cell phone. In detail, a cell phone apparatus 31 is provided which is constructed to a very considerable extent in conventional manner and, like the cell phone apparatus 1 of FIG. 1, comprises display means in the form of a display 2, input keys 3, voice input means in the form of a microphone 4, a microprocessor 6 with associated database 7 together with transceiver means 9 and an antenna 10. If it is wished to use this cell phone apparatus 31 for voice input of text for sending a short message, this short message is forwarded in a substantially conventional manner, in particular by automatic dialing of the associated destination number retrieved from the database 7, to a server 32, which comprises a transceiver antenna 33 and transceiver means 34 together additionally with a speech recognition unit 35 and a comparison unit in the form of a processor 36, in order to analyze the audio data and find at least one keyword, on the basis of which the processor 36, like the processor 6 according to FIG. 1, determines a predefined text pattern. The processor 36, with which a database 37 and a memory 38 are associated, to this end compares the found keywords with predefined keywords retrieved from the memory 38, in order thereby to find the predefined text pattern which best matches the spoken text, on the basis of the keywords. The processor 36 sends this found text pattern via the transceiver means 34 and the antenna 33 back to the cell phone apparatus 31, where the text pattern is displayed by the processor 6 on the display 2 for the purpose of confirmation and possible revision by keyed input. Moreover, just as with the embodiment according to FIG. 1, a variable text portion may be replaced in the text pattern, either by words found during analysis of the input text, such as place and time information, or by other data retrieved from the database 7, such as in particular people's names. In addition or instead, the text pattern may be added to or variable text portions thereof may be replaced by manual input via the keys 3.

As a variant of the embodiment of FIG. 3, it is also feasible to accommodate part of the speech recognition system, and in particular the keyword or text pattern comparison element, in the cell phone apparatus 31, wherein, after running the speech recognition software in the speech recognition unit 35, the server 32 sends characteristic data, e.g. phoneme sequences of recognized words in the audio data, back to the cell phone apparatus 31, where the final analysis is performed with respect to finding the correct text pattern, as has been described already with reference to FIG. 1.

FIG. 4 shows an embodiment of the transmission device in the form of a PC 41, which is equipped with a screen as a display means 42 and with a keyboard 43.

In addition, the PC 41 has a microphone 44 as voice input means for acoustic text input; a speech recognition unit 45 with appropriate speech recognition software is connected to this microphone 44.

Connected in turn to the speech recognition unit 45 is a processor 46, which constitutes the comparison unit and may access a database 47 or memory means 48, in order to retrieve the predefined keywords in the way described, and is connected with the keywords found by the speech recognition unit 45 for the purpose of finding obviously desired text patterns. Finally, a conventional interface, such as an Internet interface, may be connected to the processor 46 as transceiver means 49, in order to send the found text messages, confirmed by input using the keyboard 43, to a receiving apparatus, for example likewise a PC but also possibly a cell phone apparatus.

As is further indicated by broken lines in FIG. 4, the speech recognition unit 45 (or 5) and the comparison unit embodied by the processor 46 (or 6) may of course also be embodied in an integrated computer chip.

It should be mentioned that conventional components familiar to the person skilled in the art, such as in particular amplifier, transducer, A/D converter and the like are omitted from the drawings to simplify them and improve the clarity thereof.

Instead of a cell phone apparatus or a PC, another handheld computer, such as for example a portable Personal Digital Assistant or a palmtop, may also be used.

What is claimed is:

1. A method of sending text messages, including the steps of:

inputting to a transmitting device, by voice input, spoken text by a user, the spoken text including; 1) a content of a desired text communication and 2) an address to which the desired text communication will be sent;

processing the inputted spoken text within a speech recognition unit to generate a generated text pattern representative from the spoken text;

comparing the generated text pattern with stored, predefined text patterns, such that predefined text pattern which is the closest match is selected;

displaying the selected predefined text pattern;

confirming by user input that the displayed, selected predefined text pattern is the desired text communication;

sending the confirmed predefined text pattern as, the text message.

2. A method as claimed in claim 1, wherein the step of comparing includes that predefined text patterns with variable text portions are used.

3. A method as claimed in claim 2, wherein the step of comparing further includes that variable text portions are replaced by corresponding portions of the spoken text, e.g., place and/or time information.

4. A method as claimed in claim 2, wherein the step of comparing further includes in that variable text portions are replaced by data, e.g., names, taken from a database.

5. A method as claimed in claim 4, wherein the step of comparing further includes that, for data taken from the database and representing a name, transmit address data associated with these data are automatically read from the database and displayed for confirmation by the user.

6. A method as claimed in claim 2, wherein the step of comparing further includes that variable text portions are replaced by manually input text.

7. A method as claimed in claim 1, wherein the step of comparing further includes that the spoken text is examined in the speech recognition unit for keywords, which keywords are compared with stored keywords to determine the predetermined text pattern which is the respective closest match.

8. A method as claimed in claim 1, wherein the step of comparing further includes that the spoken text in the speech recognition unit is processed in speaker-dependent manner.

9. A device for sending a text message to a transmit address, comprising:

text input means, comprising voice input means for inputting a user's spoken text voice input;

a speech recognition unit connected to the voice input means for receiving the spoken text and converting the spoken text to text data;

a comparison unit including a memory means for storing predefined text patterns, such that comparison unit compares the text data with the predefine text patterns and selects a predefined text pattern which is the closest match to the text or the text data;

display means connected to the comparison unit for displaying the predefined text pattern which is the closest match to the text or text data; and transmission means for sending the displayed predefined text pattern after confirmed by the user to be the spoken text for transmission.

10. A device as claimed in claim 9, wherein the comparison unit takes the form of a processor.

11. A device as claimed in claim 9, wherein the memory means comprises a memory for storing predefined text patterns with variable text portions.

12. A device as claimed in claim 11, wherein the comparison unit may function to replace variable text portions with corresponding portions of the spoken text, e.g., place and/or time information.

13. A device as claimed in claim 11, wherein the comparison unit may function to replace variable text portions with data taken from a database and representing a name.

14. A device as claimed in claim 13, wherein the database contains a database field for storing transmit address data associated with the name, which transmit address data are displayed on the display for confirmation by the user, and, upon confirmation, are supplied to the transmission means.

15. A device as claimed in claim 9, wherein the speech recognition unit functions to derive keywords from the input spoken text and the memory means contains a memory for keywords, and the comparison unit compares the keywords derived from the speech recognition unit with the stored keywords.

16. A device as claimed in claim 9, wherein the speech recognition unit and the comparison unit are constructed with the text or voice input means, and the display means as an integrated apparatus.

17. A device as claimed in claim 16, wherein the apparatus is a cell phone apparatus.

* * * * *